US012750233B2

(12) United States Patent
Saha et al.

(10) Patent No.: US 12,750,233 B2
(45) Date of Patent: *Sep. 29, 2026

(54) ENCRYPTED HANDSHAKE FOR TRUST VALIDATION BETWEEN TWO APPLICATIONS

(71) Applicant: SAP SE, Walldorf (DE)

(72) Inventors: Rajib Saha, Siliguri (IN); Sateesh Babu Chilamakuri, Tirupati (IN); Laurent Pelecq, Bois-Colombes (FR)

(73) Assignee: SAP SE, Walldorf (DE)

( * ) Notice: Subject to any disclaimer, the term of this patent is extended or adjusted under 35 U.S.C. 154(b) by 19 days.

This patent is subject to a terminal disclaimer.

(21) Appl. No.: 18/990,478

(22) Filed: Dec. 20, 2024

(65) Prior Publication Data

US 2025/0125968 A1 Apr. 17, 2025

Related U.S. Application Data

(63) Continuation of application No. 17/317,610, filed on May 11, 2021, now Pat. No. 12,244,724.

(30) Foreign Application Priority Data

Mar. 23, 2021 (IN) ............................ 202111012371

(51) Int. Cl.
*H04L 29/06* (2006.01)
*H04L 9/08* (2006.01)
*H04L 9/32* (2006.01)

(52) U.S. Cl.
CPC .......... *H04L 9/3239* (2013.01); *H04L 9/0819* (2013.01); *H04L 9/3271* (2013.01); *H04L 9/3297* (2013.01); *H04L 2209/04* (2013.01)

(58) Field of Classification Search
None
See application file for complete search history.

(56) References Cited

U.S. PATENT DOCUMENTS 10,462,112 B1 * 10/2019 Makmel .............. H04L 63/0435
10,706,130 B2 * 7/2020 Kosovan .............. G06F 21/105
11,106,762 B1 * 8/2021 DeMillo .............. G06F 21/105
2013/0055372 A1 * 2/2013 Chao .................... H04L 63/083 726/7
2013/0144755 A1 * 6/2013 Mowatt .................. H04W 4/60 705/26.41
2013/0268444 A1 * 10/2013 Namgoong ............ H04L 63/08 726/4

(Continued)

OTHER PUBLICATIONS

"U.S. Appl. No. 17/317,610, Non Final Office Action mailed May 24, 2023", 33 pgs.

(Continued)

*Primary Examiner* — Bassam A Noaman
*Assistant Examiner* — Hassan A Hussein
(74) *Attorney, Agent, or Firm* — SCHWEGMAN LUNDBERG & WOESSNER, P.A.

(57) ABSTRACT

In an example embodiment, a framework is provided that provides a secure mechanism to limit misuse of licensed applications. Specifically, a mutual handshake is established, using existing properties of a requesting application, and wraps objects with dynamic parameters, such as a current timestamp, to perform masking, hashing, and encryption for the handshake.

17 Claims, 7 Drawing Sheets

(56) References Cited

U.S. PATENT DOCUMENTS

| | | | | |
|---|---|---|---|---|
| 2014/0101061 | A1* | 4/2014 | Boudreau | G06F 21/10 705/317 |
| 2014/0164785 | A1* | 6/2014 | Ochiai | H04L 9/0816 713/189 |
| 2014/0351910 | A1* | 11/2014 | Tenenboym | G06Q 20/401 726/7 |
| 2015/0295907 | A1* | 10/2015 | Abrahamson | H04L 9/0656 380/46 |
| 2016/0065593 | A1* | 3/2016 | Bengochea | G06F 9/542 726/29 |
| 2016/0105414 | A1* | 4/2016 | Bringer | H04L 9/3247 713/168 |
| 2017/0308684 | A1* | 10/2017 | Morino | G06F 21/105 |
| 2018/0232526 | A1* | 8/2018 | Reid | G06F 21/6218 |
| 2018/0278624 | A1* | 9/2018 | Kuperman | G06F 21/33 |
| 2019/0007212 | A1* | 1/2019 | Neve de Mevergnies | H04L 9/3226 |
| 2019/0052467 | A1* | 2/2019 | Bettger | H04L 9/0643 |
| 2019/0230462 | A1* | 7/2019 | McLarty | H04L 41/22 |
| 2019/0246272 | A1* | 8/2019 | Richard | H04W 12/126 |
| 2019/0268741 | A1* | 8/2019 | Shen | H04W 76/10 |
| 2019/0305957 | A1* | 10/2019 | Reddy | G06F 8/60 |
| 2020/0021448 | A1* | 1/2020 | Chumbley | H04L 63/0884 |
| 2020/0067699 | A1* | 2/2020 | Resch | G09C 1/00 |
| 2020/0274708 | A1* | 8/2020 | Vijayanarayanan | H04L 9/3247 |
| 2020/0342460 | A1* | 10/2020 | Sun | G06Q 20/4014 |
| 2020/0396068 | A1* | 12/2020 | Sarno | H04L 9/0894 |
| 2021/0034729 | A1* | 2/2021 | Chung | H04L 9/14 |
| 2021/0203486 | A1* | 7/2021 | Kilburn | H04L 9/0877 |
| 2021/0377247 | A1* | 12/2021 | Nigro | H04L 9/3239 |
| 2022/0029803 | A1* | 1/2022 | Vijayanarayanan | H04L 9/32 |
| 2022/0045852 | A1* | 2/2022 | Isshiki | H04L 9/3271 |
| 2022/0150050 | A1* | 5/2022 | Gundavelli | H03M 7/6047 |
| 2022/0311620 | A1 | 9/2022 | Saha et al. | |
| 2022/0321363 | A1* | 10/2022 | Isshiki | G06F 21/32 |
| 2023/0131437 | A1* | 4/2023 | Shirvanian | H04L 9/3231 713/155 |
| 2026/0046317 | A1* | 2/2026 | Crabtree | H04L 63/104 |

OTHER PUBLICATIONS

"U.S. Appl. No. 17/317,610, Examiner Interview Summary mailed Aug. 9, 2023", 2 pgs.
"U.S. Appl. No. 17/317,610, Response filed Aug. 16, 23 to Non Final Office Action mailed May 24, 2023", 13 pgs.
"U.S. Appl. No. 17/317,610, Final Office Action mailed Oct. 31, 2023", 32 pgs.
"U.S. Appl. No. 17/317,610, Examiner Interview Summary mailed Dec. 13, 2023", 2 pgs.
"U.S. Appl. No. 17/317,610, Response filed Dec. 14, 23 to Final Office Action mailed Oct. 31, 2023", 8 pgs.
"U.S. Appl. No. 17/317,610, Advisory Action mailed Jan. 23, 2024", 2 pgs.
"U.S. Appl. No. 17/317,610, Non Final Office Action mailed Feb. 26, 2024", 22 pgs.
"U.S. Appl. No. 17/317,610, Examiner Interview Summary mailed Apr. 29, 2024", 2 pgs.
"U.S. Appl. No. 17/317,610, Response filed May 1, 2024 to Non Final Office Action mailed Feb. 26, 2024", 13 pgs.
"U.S. Appl. No. 17/317,610, Final Office Action mailed Jun. 10, 2024", 26 pgs.
"U.S. Appl. No. 17/317,610, Response filed Jul. 10, 2024 to Final Office Action mailed Jun. 10, 2024", 7 pgs.
"U.S. Appl. No. 17/317,610, Advisory Action mailed Jul. 22, 2024", 2 pgs.
"U.S. Appl. No. 17/317,610, Notice of Allowance mailed Nov. 14, 2024", 17 pgs.

* cited by examiner

CONTINUE ON FIG 2C

ENCRYPTED HANDSHAKE FOR TRUST VALIDATION BETWEEN TWO APPLICATIONS

CROSS-RELATION TO RELATED APPLICATIONS

This application is a continuation of U.S. application Ser. No. 17/317,610, filed May 11, 2021, which application claims priority to Indian Provisional Application No. 202111012371, filed Mar. 23, 2021, entitled "A HOLISTIC MECHANISM TO IDENTIFY SPECIAL APPLICATION," all applications hereby incorporated herein by reference in their entireties.

TECHNICAL FIELD

This document generally relates to computer security. More specifically, this document relates to an encrypted handshake for trust validation between two applications.

BACKGROUND

The increasing movement towards moving applications to the cloud has muddied the distinction between applications. It is now common, for example, for an entity, such as a company, to purchase licenses to operate enterprise applications in the cloud and also to operate enterprise applications on premises. While these traditionally have been distinct applications offered by distinct software developers, as mergers and acquisitions increase in the software industry, it is not uncommon for two distinct applications (one in the cloud and one on-premises) to be developed and maintained by the same software developer. It has also become more common for these two distinct applications to interact. For example, an entity may wish for their instance of a cloud-based application to retrieve data stored in their instance of the on-premises application.

This has led many entities to question the need for separately expensed licenses for each application, especially when both applications are provided from the same software developer and interact with each other. This is further complicated by the fact that some software developers charge a license fee based on the number of times the application is used (called the license count), and thus entities may wish for uses of the on-premises application caused by interaction with the cloud-based application to not count against their license count for the on-premises application.

A technical problem exists, however, should a software provider wish to provide such a fee structure: there currently is no way to securely distinguish among an interaction between a licensed cloud application and a particular on-premises application, and an interaction between an unlicensed cloud application (or simply a malicious party) and the particular on-premises application. Without a way to ensure that the party requesting interaction with the on-premises application is indeed a "special client" who has already paid a license fee on the cloud-based application they are making the request from, and thus should have the interaction not count against the license count of the on-premises application, then the software provider is at risk of unauthorized individuals or unauthorized uses from authorized individuals being able to gain access to uses of the on-premises application without incurring a license fee.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a framework is provided that provides a secure mechanism to limit misuse of licensed applications. Specifically, a mutual handshake is established, using existing properties of a requesting application, and then wraps objects then with dynamic parameters, such as a current timestamp, to perform masking, hashing, and encryption for the handshake.

The entire logic of the framework is masked from the external community. Everything can be implemented within the scope of a software developer kit (SDK), thus reducing the possibility of breach of misuse.

Figure 1:
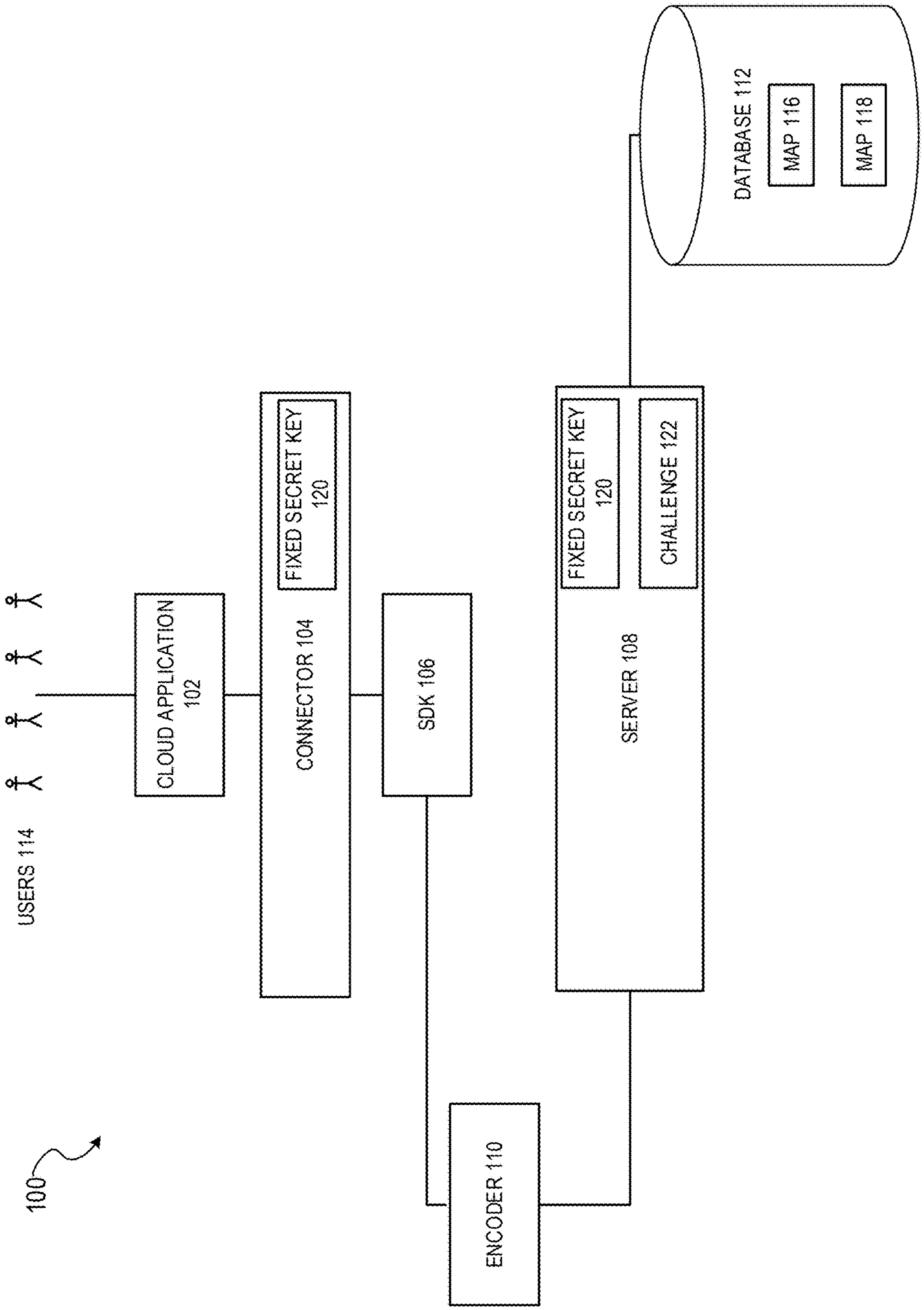
FIG. 1 is a block diagram illustrating a system for providing a secure handshaking environment for applications, in accordance with an example embodiment.

FIG. 1 is a block diagram illustrating a system 100 for providing a secure handshaking environment for applications, in accordance with an example embodiment. The system 100 includes a cloud application 102, connector 104, SDK 106, server 108, encoder 110, and database 112. Users 114 are also depicted. Encryption is accomplished by using shared code, such as in SDK 106. The cloud application 102 may be any application running in a cloud environment, with at least the bulk of its processing logic and data storage residing in the cloud, namely on physical devices located across the Internet from the users 114 and from the companies that operate the application (e.g., an entity which employs users 114).

Connector 104 is software designed to connect cloud application 102 and server 108. An example of a connector 104 would be live data connection (LDC) software. Generally, connector 104 provides interface procedures for connecting the cloud application 102 and the server 108 for operations such as data retrieval.

SDK 106 is a static collection of software development tools in one installable package. It generally facilitates the creation of applications by having a compiler, debugger, and a software framework in one package. Rather than Application Program Interfaces (APIs), the SDK 106 uses a static library of reusable functions to interface to a particular programming language. In an example embodiment, some of these functions are used to implement one or more procedures needed to execute the handshaking process described below.

The encoder 110 acts as a framework to perform additional procedures needed to execute the handshaking process described below, including, as will be seen, encoding procedures. The server 108 is a software program to which the cloud application 102 is connecting. It should be noted that while the server 108 is described as a server, this does not mean that it operates in a cloud and in fact, in many example embodiments, the server 108 will operate on-premises while the cloud application 102, which is essentially a client, operates in the cloud.

Database 112 stores, among other things, one or more maps 116, 118 or other records used by the handshaking procedures, as will be described in more detail below.

The connector 104 additionally maintains a fixed secret key 120 for a client, which is obtained from the server 108, which also maintains the fixed secret key 120 for the client. Each different client has its own fixed secret key 120. Additionally, the server 108 maintains a challenge 122, which is a string used in the handshaking procedures, as will be described in more detail below.

Figure 2A:
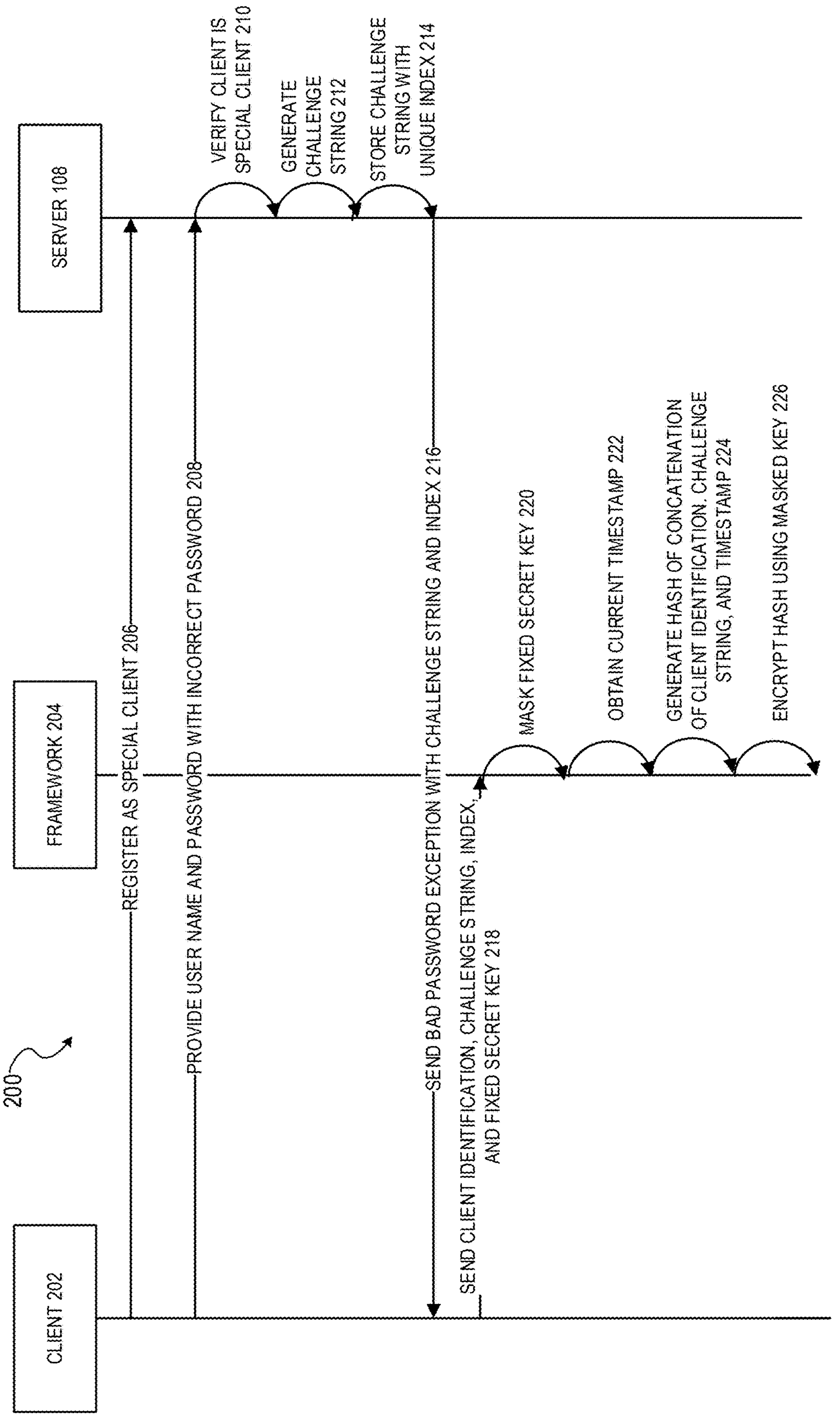
FIGS. 2A-2C are sequence diagrams illustrating a secure handshaking process, in accordance with an example embodiment.
Figure 2B:
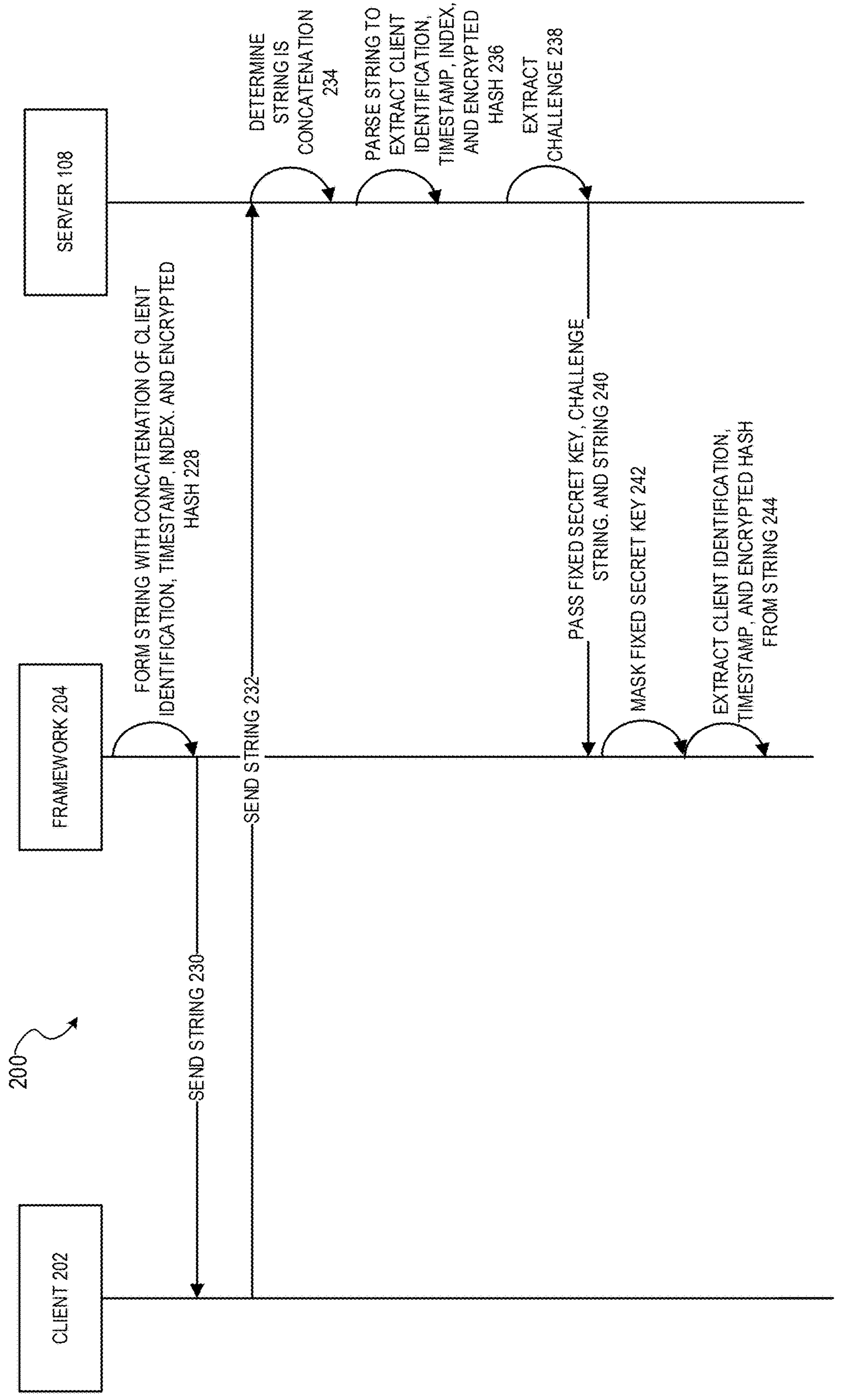
Figure 2C:
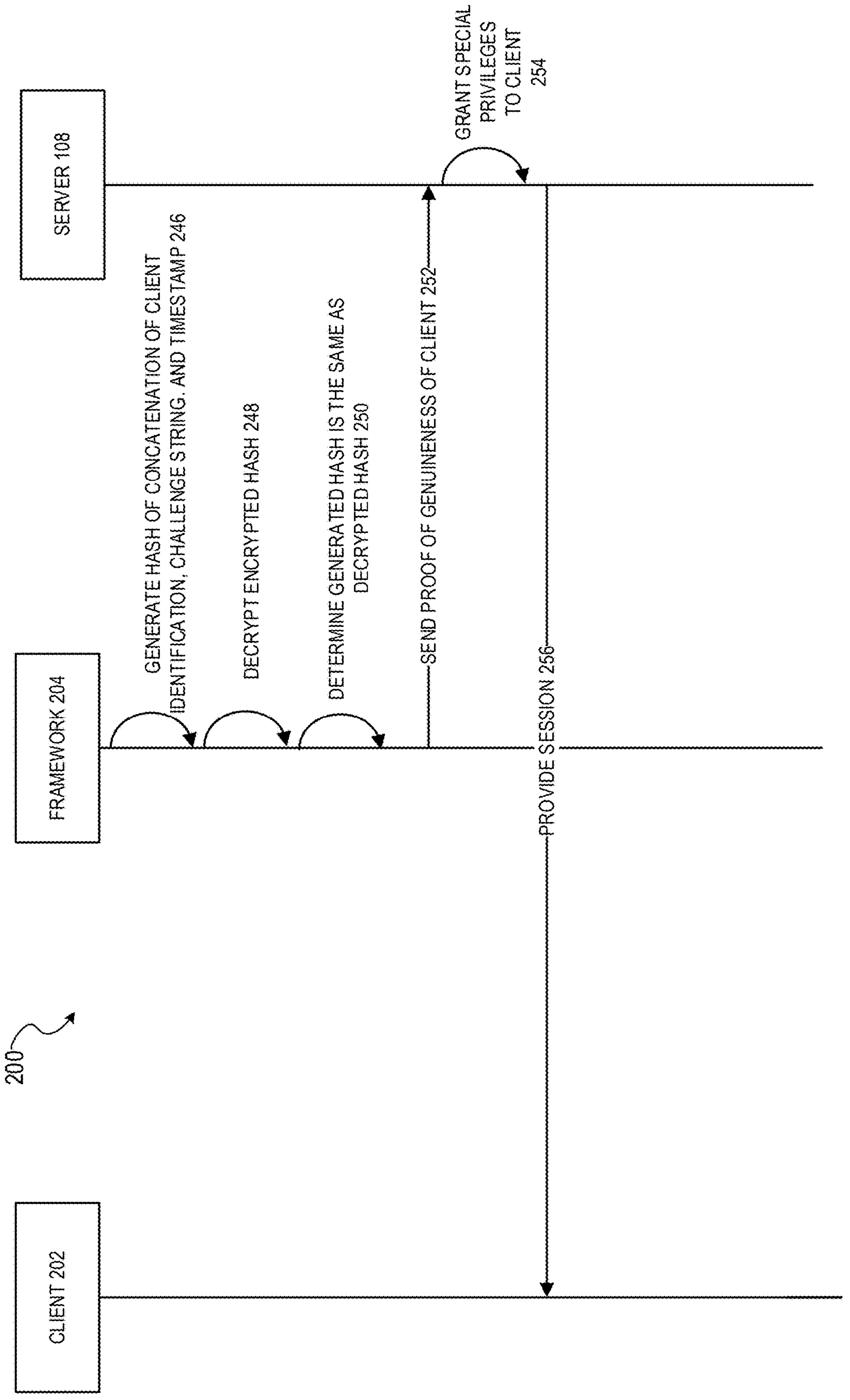

FIGS. 2A-2C are sequence diagrams illustrating a secure handshaking process 200, in accordance with an example embodiment. Beginning with FIG. 2A, depicted here are a client 202, which may be, for example, the cloud application 102 of FIG. 1, a framework 204, and a server 108. The framework 204 may be implemented in the SDK 106 of FIG. 1, but may additionally utilize the encoder 110 for some of its operations.

At operation 206, the client 202 registers as a special client with the server 108. A special client is a client who is going to be granted special privileges based on them being authenticated as requesting connection from the client 202 to the server 108. These special privileges may include, for example, this connection or the user of data from the server 108 via this connection not counting against the special client's license count for the server 108.

Separately, server 108 and client 202 share a fixed secret key ($K_y$) at installation-time. In an example embodiment, the fixed secret key is a random or pseudo-random 32 byte key.

At operation 208, the client 202 provides a user name (B) and password (L) for login to the server 108. It additionally sends a client identification (A), as well as an incorrect fixed predefined password (C). The incorrect fixed predefined password is any password that is uncommon but also unsupported (from the server 108 perspective). In some example embodiments, this incorrect fixed predefined password is generated by the server 108 and provided to the client 202 when the secret key is provided to the client 202 (e.g., at operation 208). The server 108 and the framework 204 have a mutual understanding and sharing of the incorrect fixed predefined password as well.

At operation 210, the server 108 uses the client identification (A) to verify that the client identification (A) corresponds to a special client. This may be accomplished by accessing a first map in the database 112. The first map may include a list of client identifications that correspond to special clients. If the client identification (A) provided in operation 210 is on this list, then the server 108 may assume that the client identification (A) corresponds to a special client and continue the secure handshaking process 200. If not, then the secure handshaking process 200 may end. If that occurs, the client 202 may still be able to access or retrieve data from the sever 108, but the special privileges may not be granted (e.g., the connection and/or data use would count against the license count).

At operation 212, the server 108 generates a challenge (D) string. In an example embodiment, the challenge (D) string may be a random or pseudo random 32 byte base-64 encoded string. At operation 214, the server stores the challenge (D) string with a unique index (E) in a second map in the database 112. At operation 216, the server 108 sends a bad password exception with the tag "Challenge <D:E>" to the client 202.

Upon receiving the bad password exception with the challenge tag, the client 202, at operation 218, sends the client identification (A), challenge (D) string, unique index (E), and fixed secret key ($K_y$) to the framework 204. At operation 220, the framework 204 masks the fixed secret key ($K_y$) with a fixed masker (F), producing masked key (G). In an example embodiment, this may be performed using an XOR operation with a 32 byte masker.

At operation 222, the current timestamp (H) may be obtained. This may be obtained by referencing a system or external clock. At operation 224, a hash of the concatenated string A: D: H is generated. This may be referred to as (I). In an example embodiment, this hashing may be performed using the SHA 256 hashing algorithm. SHA 256 is built with a Merkle-Darngard structure derived from a one-way compression function that is created with Davies-Meyer structure from a specialized block cipher. At operation 226, the hash is encrypted using the masked key (G), producing encrypted hash (J). This may be performed using the Advanced Encryption Standard (AES) 256 Outbook Feedback Mode (OFB) 128 algorithm. AES 256 performs block encryption using 256 bit encryption key. OFB 128 enables a block encryptor to be used as a stream encryptor without needing padding data. In this mode, it uses encryption results to XOR plaintext to obtain cyphertext.

Continuing on FIG. 2B, at operation 228, a string is formed with the concatenation of A:H:E:J. This string may be represented as (K). At operation 230, K may be sent to the client 202.

In response to operation 230, the client 202, at operation 234, sends K to the server 108 as a client ID, along with B as a username and L as the password. At operation 234, in response to receiving K as a client ID, the server 108 determines that special handling needs to be applied since K is in the form _:_:_:_. At operation 236, the server 108 parses K to extract A, H, E, and J. Then, at operation 238, the server 108 extracts the challenge D from the second map. Then, at operation 240, the server passes K, D, and $K_y$ to the framework 204.

At operation 242, the framework 204 masks $K_y$ with a fixed masker F, producing a masked key ($G_m$). In an example embodiment, this may be performed using an XOR operation with a 32 byte masker. At operation 244, the framework 204 extracts the client ID A, timestamp H, and encrypted hash J from K by parsing it using the delimiter ":".

Continuing on FIG. 2C, at operation 246, a hash of the string A+D+H is generated. This hash may be called ($I_1$). In an example embodiment, this hashing may be performed using the SHA 256 hashing algorithm. At operation 248, J may be decrypted using the masked key $G_m$. This decrypted hash may be called ($I_2$). At operation 250, it is determined if $I_1=I_2$. If so, then special privileges may be granted to the client 202 including, for example, not increasing the license count when the server 108 is accessed. Otherwise, someone may be attempting to misuse the application. Assuming they match, at operation 252, proof of the genuineness of the client 202 is sent to the server 108.

At operation 254, upon receiving proof of the genuineness of the client 202, the server 108 grants special privileges to the client 202 including, for example, bypassing the license. At operation 256, the server then provides a session to the client 202.

The above process provides a secure and safe handshaking mechanism to avoid misuse of server resources by unauthorized clients. As the framework is integrated inside the client and the server as a static library, it is not open for use by any unauthorized or custom clients. The binary of the framework is not open or shipped with a product. For encryption, a masked confidential secret key is used, which is only known between the server and a special client. No other unauthorized or custom client can be aware of it.

The challenge and timestamp are two dynamic parameters that are appended along with the client identification for hashing and encryption. Thus, hacking the server is very difficult. During the handshake, only masked, hashed, and encrypted data is used, making hacking even harder.

It should be noted that while the above procedures are described in the context of a client being a cloud application and the server being an on-premises application, there is nothing preventing the procedures from being applied to any two applications, regardless of location. In other words, the procedures may be used as a way to securely authenticate any client to any server, and nothing in this document shall be construed as limiting the scope of protection to only cloud applications and on-premises applications, unless explicitly recited.

Additionally, while the special privileges bestowed upon the authenticated and verified clients are described as including bypassing license counts for server accesses or server data retrieval, nothing in this document shall be construed as limiting the scope of protection to only use cases where the special privileges include bypassing license counts. The same procedures can be used to bestow alternative special privileges upon the authenticated and verified clients.

Furthermore, in an example embodiment, characteristics of an entity operating a client, such as the client identification, may be obtained from business evaluation objects, such as InfoObjects® from SAP SE of Frankfurt, Germany. InfoObjects® are divided into characteristics, key figures, units, time characteristics, and technical characteristics. Using InfoObjects®, information about an entity may be mapped in a structured form. Characteristics are sorting keys, such as company codes, product ID, customer groups, fiscal years, periods, and regions. They specify classification objects for the data set and therefore reference objects for the key figures. In an InfoCube, for example, characteristics are stored as dimensions. These dimensions are linked by dimension identifications to the key figures in the fact table. The characteristics determine the granularity at which the key figures are kept in the InfoCube. The key figures provide the values that are reported on in a query. Examples include quantity, amount, or number of items. The key figures form the data portion. Units are used so that the values for the key figures have meanings. This may include currencies and units of measurement. Time characteristics include data, fiscal year, and other temporal-based features. Technical characteristics have a single meaning, such as a request number.

One example of a cloud application is an analytics application, such as SAP Analytics Cloud® from SAP SE, of Frankfurt. Germany. One Example of an on-premises application is SAP Business Objects Enterprise® (BOE) from SAP SE of Frankfurt, Germany.

In view of the disclosure above, various examples are set forth below. It should be noted that one or more features of an example, taken in isolation or combination, should be considered within the disclosure of this application.

Figure 3:
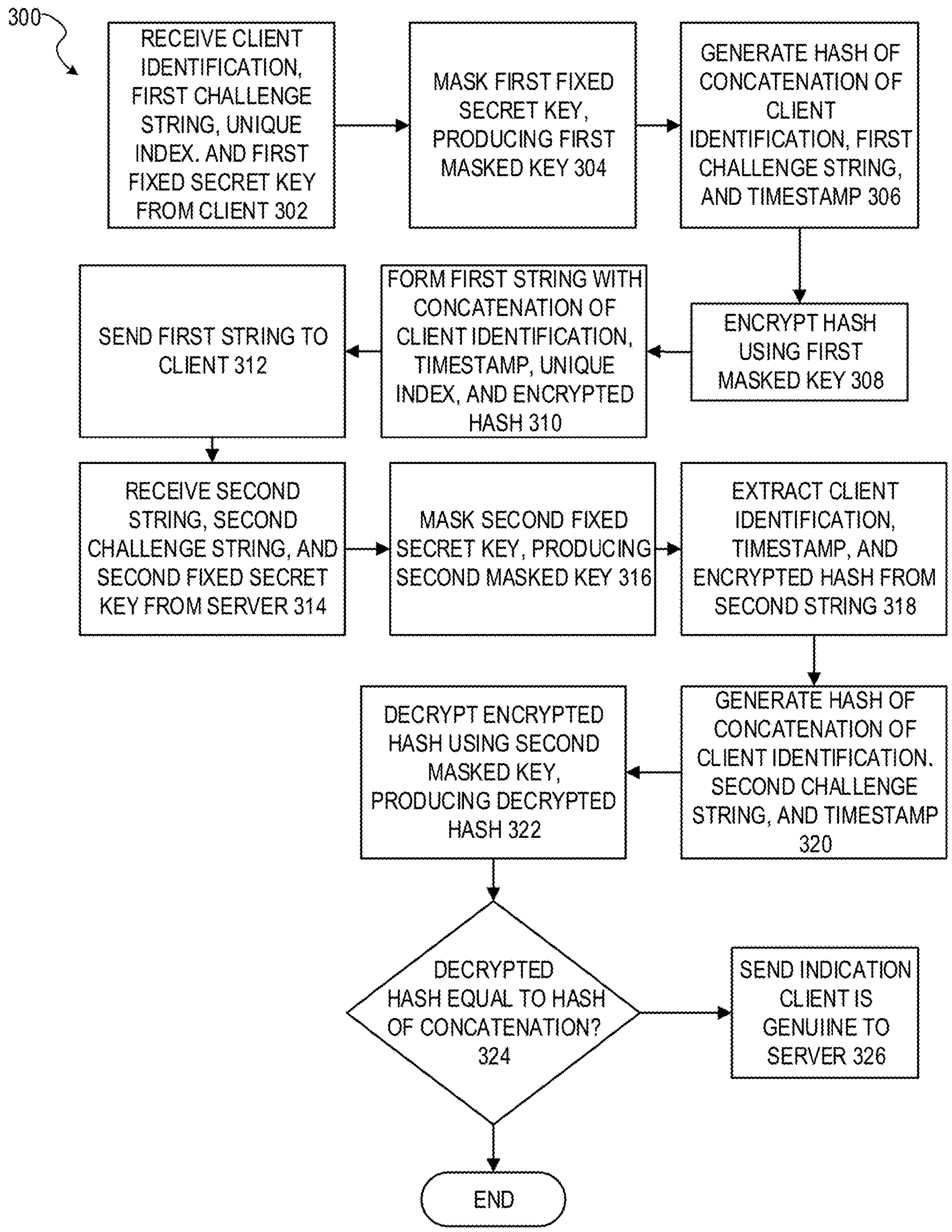
FIG. 3 is a flow diagram illustrating a method for secure handshaking, in accordance with an example embodiment.

FIG. 3 is a flow diagram illustrating a method 300 for secure handshaking, in accordance with an example embodiment. This flow diagram is presented from the perspective of a framework, such as framework 204, that interacts with a client 202 and server 108 in order to facilitate a determination of whether the client 202 is genuine so as to allow the server 108 to provide special privileges to the client 202. As such, there are operations performed by the client and by the server that are not depicted in this figure.

At operation 302, a client identification, a first challenge string, a unique index, and a first fixed secret key are received from a client. The first fixed secret key may have been provided from the server to the client along with a (deliberately) incorrect fixed predefined password. The client sends a login packet to the server that includes the client identification, a username, and the incorrect fixed predefined password, at which point the server determines that the client identification corresponds to a special client identification by, for example, referencing a list of special client identifications stored in a map in a database. The list identifies client identifications that are to be accorded special privileges, such as bypassing license counts for the server. The server then is able to generate a random challenge string, store it in another map with a unique index, and then send a bad password exception to the client with the challenge string and index.

In response to the bad password exception, the client then sends the information in operation 302 to the framework.

At operation 304, the framework masks the first fixed secret key with a fixed masker, producing a first masked key. This masking may be performed using a XOR operation with a 32 byte masker. At operation 306, the framework generates a hash of a concatenation of the client identification, the first challenge string, and a timestamp. The timestamp may be the current time, or a timestamp of the communication in operation 302. The hash may be generated using the SHA 256 hashing algorithm.

At operation 308, the hash is encrypted with the first masked key. In an example embodiment, encryption may be performed using the AES 256 OFB 128 encryption algorithm. At operation 310, the framework forms a first string with a concatenation of the client identification, timestamp, unique index, and encrypted hash. At operation 312, the framework sends the first string to the client.

The client then sends information directly to the server to log in, including the first string (as the client identification), the username, and a user password. The server then identifies the client identification it receives as a concatenated string (based on its form, for example, if there are delimiters in it). If so, it then parses it into an actual client identification, timestamp, index, and encrypted hash.

At operation 314, the framework receives, from the server, a second string, a second challenge string, and a second fixed secret key. It should be noted that while these pieces of information are described as a "second" string, "second" challenge string, and "second" fixed secret key, when the client is genuine, these "second" pieces of information will actually be identical to their corresponding "first" pieces of information (i.e., the second string is the same as the first string, the second challenge string is the same as the first challenge string, and the second fixed secret key is the same as the first fixed secret key).

At operation 316, the framework masks the second fixed secret key with the fixed masker, producing a second masked key. Again, this may be performed using an XOR operation and a 32 byte masker. At operation 318, the framework extracts the client identification, the timestamp, and the encrypted hash from the second string. This may be performed by parsing based on a delimiter, such as ":". At operation 320, the framework generates a hash of a concatenation of the client identification, the second challenge string, and the timestamp. In an example embodiment, this hashing may be performed using the SHA 256 hashing algorithm.

At operation 322, the framework decrypts the encrypted hash using the second masked key, producing a decrypted hash. At operation 324, the framework determines whether the decrypted hash is equal to the hash of the concatenation of the client identification, the second challenge string, and the timestamp. If so, then the client is genuine and at operation 326, the framework may inform the server that the client is genuine. The server then is able to grant the special privileges to the client, assuming the login credentials are correct.

In view of the disclosure above, various examples are set forth below. It should be noted that one or more features of an example, taken in isolation or combination, should be considered within the disclosure of this application.

Example 1

A system comprising:
- at least one hardware processor; and
- a computer-readable medium storing instructions that, when executed by the at least one hardware processor, cause the at least one hardware processor to perform operations comprising:
- receiving, from a client, a client identification, a first challenge string, a unique index, and a first fixed secret key;
- masking the first fixed secret key with a fixed masker, producing a first masked key;
- encrypting a hash of a concatenation of the client identification, the first challenge string, and a timestamp, with the first masked key;
- sending a first string to the client, with a concatenation of the client identification, timestamp, unique index, and encrypted hash;
- receiving, a second string, a second challenge string, and a second fixed secret key;
- masking the second fixed secret key with the fixed masker, producing a second masked key;
- extracting the client identification, the timestamp, and the encrypted hash from the second string;
- decrypting the encrypted hash using the second masked key, producing a decrypted hash; and
- determining that the client is genuine in response to a determination that the decrypted hash is equal to a hash of the concatenation of the client identification, the second challenge string, and the timestamp.

Example 2

The system of Example 1, wherein the first fixed secret key is identical to the second fixed secret key.

Example 3

The system of Examples 1 or 2, wherein the first challenge string is identical to the second challenge string.

Example 4

The system of any of Examples 1-3, wherein the first string is identical to the second string.

Example 5

The system of any of Examples 1-4, wherein the determination that the client is genuine is sent to the server, and the server then grants the client special privileges based on the genuineness of the client.

Example 6

The system of Example 5, wherein the special privileges include bypassing of a license count of the server.

Example 7

The system of any of Examples 1-6, wherein the first change string is randomly generated by the server and sent from the server to the client.

Example 8

The system of any of Examples 1-7, wherein the masking the first fixed secret key uses an XOR operation.

Example 9

The system of any of Examples 1-8, wherein the extracting includes parsing the second string using delimiters.

Example 10

A method comprising:
- receiving, from a client, a client identification, a first challenge string, a unique index, and a first fixed secret key;
- masking the first fixed secret key with a fixed masker, producing a first masked key;
- encrypting a hash of a concatenation of the client identification, the first challenge string, and a timestamp, with the first masked key;
- sending a first string to the client, with a concatenation of the client identification, timestamp, unique index, and encrypted hash;
- receiving, a second string, a second challenge string, and a second fixed secret key;
- masking the second fixed secret key with the fixed masker, producing a second masked key;
- extracting the client identification, the timestamp, and the encrypted hash from the second string;
- decrypting the encrypted hash using the second masked key, producing a decrypted hash; and
- determining that the client is genuine in response to a determination that the decrypted hash is equal to a hash of the concatenation of the client identification, the second challenge string, and the timestamp.

Example 11

The method of Example 10, wherein the first fixed secret key is identical to the second fixed secret key.

Example 12

The method of Example 10 or 11, wherein the first challenge string is identical to the second challenge string.

Example 13

The method of any of Examples 10-12, wherein the first string is identical to the second string.

Example 14

The method of any of Examples 10-13, wherein the determination that the client is genuine is sent to the server, and the server then grants the client special privileges based on the genuineness of the client.

Example 15

The method of Example 14, wherein the special privileges include bypassing of a license count of the server.

Example 16

The method of any of Examples 10-15, wherein the first change string is randomly generated by the server and sent from the server to the client.

Example 17

The method of any of Examples 10-16, wherein the masking the first fixed secret key uses an XOR operation.

Example 18

The method of any of Examples 10-17, wherein the extracting includes parsing the second string using delimiters.

Example 19

A non-transitory machine-readable medium storing instructions which, when executed by one or more processors, cause the one or more processors to perform operations comprising:

- receiving, from a client, a client identification, a first challenge string, a unique index, and a first fixed secret key;
- masking the first fixed secret key with a fixed masker, producing a first masked key;
- encrypting a hash of a concatenation of the client identification, the first challenge string, and a timestamp, with the first masked key;
- sending a first string to the client, with a concatenation of the client identification, timestamp, unique index, and encrypted hash;
- receiving, a second string, a second challenge string, and a second fixed secret key;
- masking the second fixed secret key with the fixed masker, producing a second masked key;
- extracting the client identification, the timestamp, and the encrypted hash from the second string;
- decrypting the encrypted hash using the second masked key, producing a decrypted hash; and
- determining that the client is genuine in response to a determination that the decrypted hash is equal to a hash of the concatenation of the client identification, the second challenge string, and the timestamp.

Example 20

The non-transitory machine-readable medium of Example 19, wherein the first fixed secret key is identical to the second fixed secret key.

Figure 4:
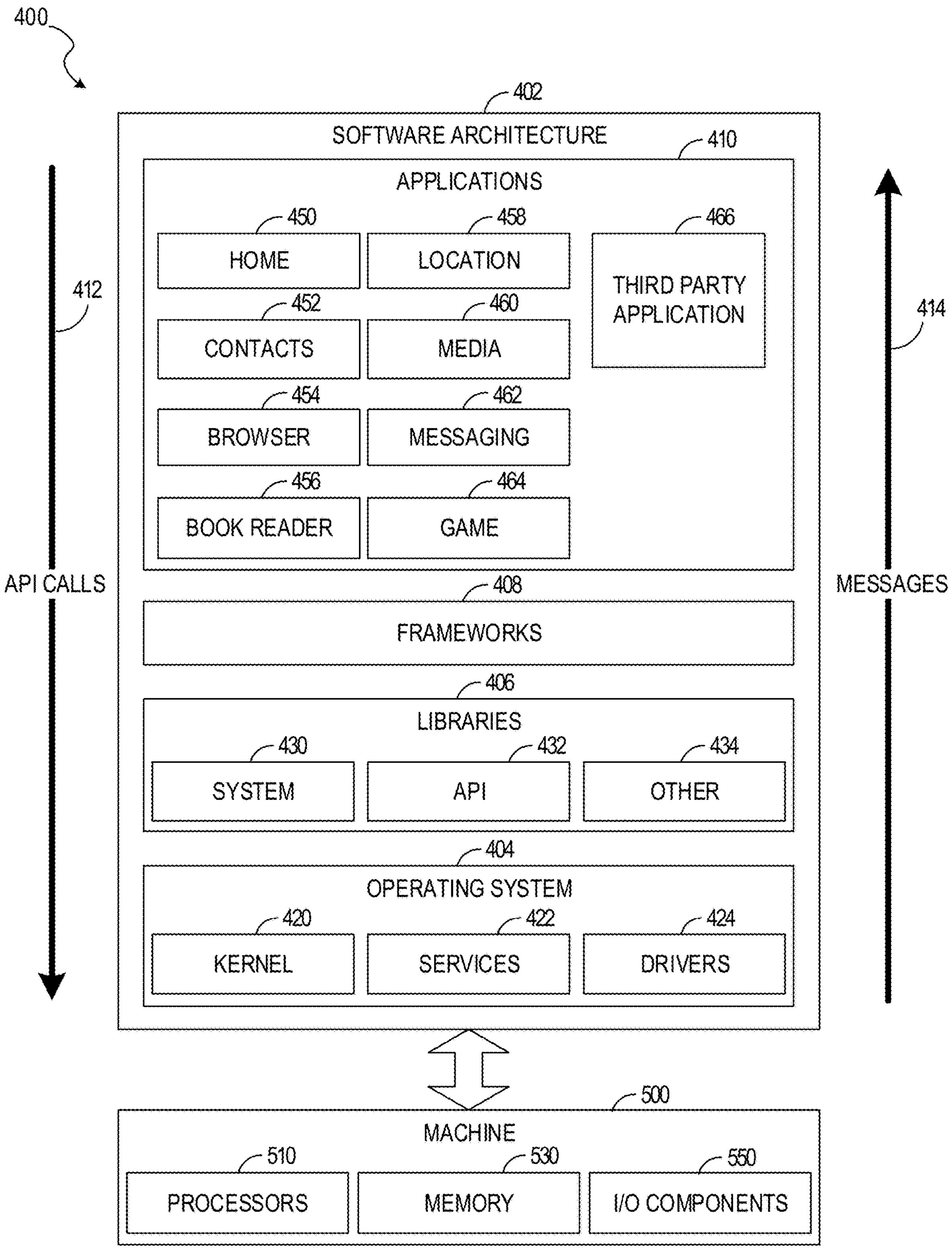
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
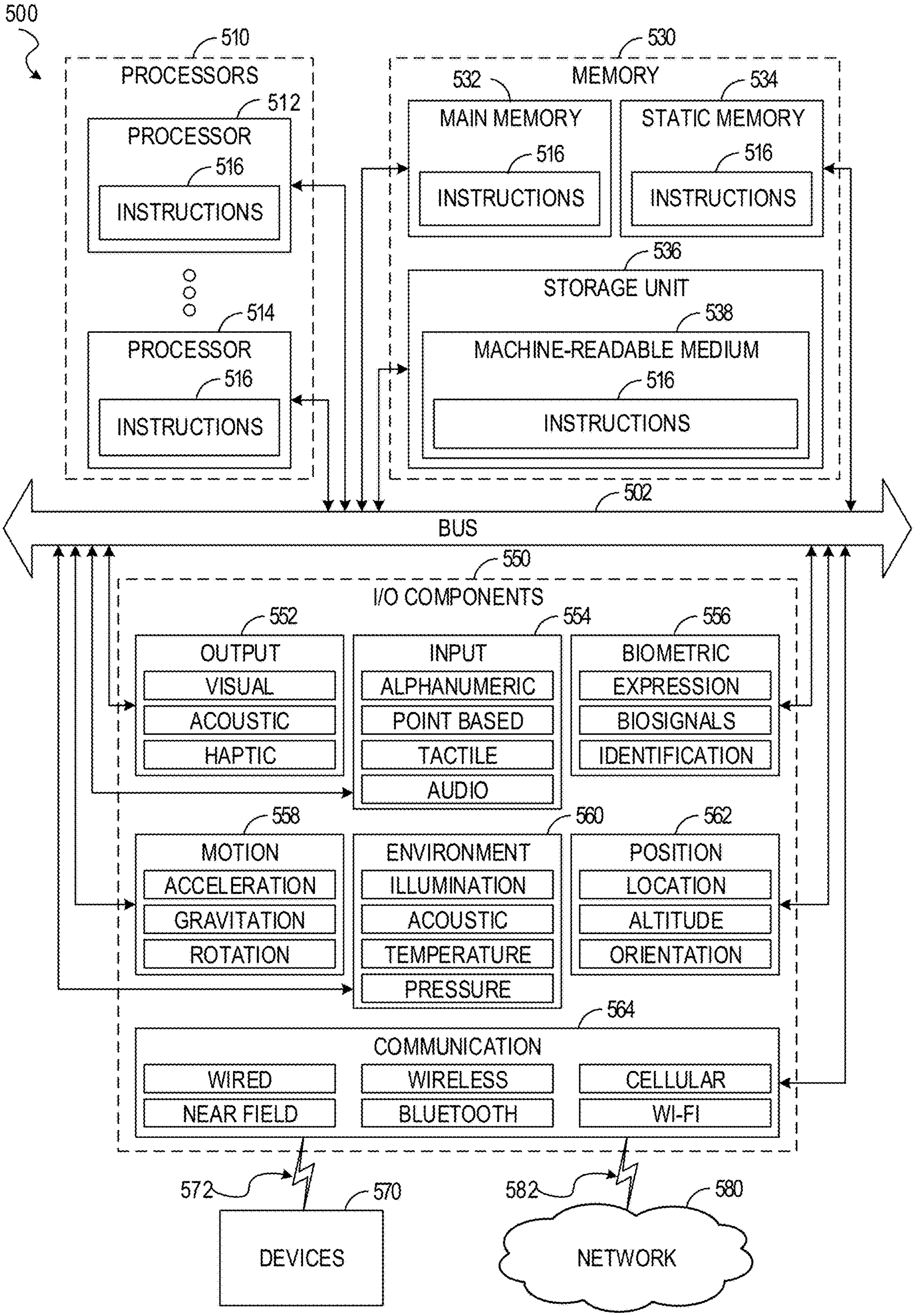
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the methods of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations on a framework, the operations comprising:

receiving, by the framework, from a client, a client identification, a first challenge string, a unique index, and a first fixed secret key;

masking, by the framework, the first fixed secret key with a fixed masker, producing a first masked key;

encrypting, by the framework, a hash that includes a first concatenation of the client identification, the first challenge string, and a timestamp, using the first masked key;

sending, by the framework, a first string to the client, with a second non-hashed concatenation of the client identification, the timestamp, the unique index, and the encrypted hash that includes the first concatenation of the client identification, the first challenge string, and the timestamp;

receiving, by the framework, a second string, a second challenge string, and a second fixed secret key, wherein the first fixed secret key is identical to the second fixed secret key;

masking, by the framework, the second fixed secret key with the fixed masker, producing a second masked key;

extracting, by the framework, the client identification, the timestamp, and the encrypted hash that were included in the second string;

decrypting, by the framework, the encrypted hash using the second masked key, producing a decrypted hash;

determining, by the framework, that the client is genuine in response to a determination that the decrypted hash is equal to a hash of a third concatenation of the client identification, the second challenge string, and the timestamp; and granting special privileges to the client based on the determination that the client is genuine.

2. The system of claim 1, wherein the first challenge string is identical to the second challenge string.

3. The system of claim 1, wherein the first string is identical to the second string.

4. The system of claim 1, wherein the determination that the client is genuine is sent to a server, and the server then grants the client special privileges based on genuineness of the client.

5. The system of claim 4, wherein the special privileges include bypassing of a license count of the server.

6. The system of claim 1, wherein the first challenge string is randomly generated by a server and sent from the server to the client.

7. The system of claim 1, wherein the masking the first fixed secret key uses an XOR operation.

8. The system of claim 1, wherein the extracting includes parsing the second string using delimiters.

9. A method comprising:

receiving, by the framework, from a client, a client identification, a first challenge string, a unique index, and a first fixed secret key;

masking, by the framework, the first fixed secret key with a fixed masker, producing a first masked key;

encrypting, by the framework, a hash that includes a first concatenation of the client identification, the first challenge string, and a timestamp, using the first masked key;

sending, by the framework, a first string to the client, with a second non-hashed concatenation of the client identification, the timestamp, the unique index, and the encrypted hash that includes the first concatenation of the client identification, the first challenge string, and the timestamp;

receiving, by the framework, a second string, a second challenge string, and a second fixed secret key, wherein the first fixed secret key is identical to the second fixed secret key;

masking, by the framework, the second fixed secret key with the fixed masker, producing a second masked key;

extracting, by the framework, the client identification, the timestamp, and the encrypted hash that were included in the second string;

decrypting, by the framework, the encrypted hash using the second masked key, producing a decrypted hash;

determining, by the framework, that the client is genuine in response to a determination that the decrypted hash is equal to a hash of a third concatenation of the client identification, the second challenge string, and the timestamp; and granting special privileges to the client based on the determination that the client is genuine.

10. The method of claim 9, wherein the first challenge string is identical to the second challenge string.

11. The method of claim 9, wherein the first string is identical to the second string.

12. The method of claim 9, wherein the determination that the client is genuine is sent to a server, and the server then grants the client special privileges based on genuineness of the client.

13. The method of claim 12, wherein the special privileges include bypassing of a license count of the server.

14. The method of claim 9, wherein the first challenge string is randomly generated by a server and sent from the server to the client.

15. The method of claim 9, wherein the masking the first fixed secret key uses an XOR operation.

16. The method of claim 9, wherein the extracting includes parsing the second string using delimiters.

17. A non-transitory machine-readable medium storing instructions which, when executed by one or more processors, cause the one or more processors to perform operations on a framework, the operations comprising:

receiving, by the framework, from a client, a client identification, a first challenge string, a unique index, and a first fixed secret key;

masking, by the framework, the first fixed secret key with a fixed masker, producing a first masked key;

encrypting, by the framework, a hash that includes a first concatenation of the client identification, the first challenge string, and a timestamp, using the first masked key;

sending, by the framework, a first string to the client, with a second non-hashed concatenation of the client identification, the timestamp, the unique index, and the encrypted hash that includes the first concatenation of the client identification, the first challenge string, and the timestamp;

receiving, by the framework, a second string, a second challenge string, and a second fixed secret key, wherein the first fixed secret key is identical to the second fixed secret key;

masking, by the framework, the second fixed secret key with the fixed masker, producing a second masked key;

extracting, by the framework, the client identification, the timestamp, and the encrypted hash that were included in the second string;

decrypting, by the framework, the encrypted hash using the second masked key, producing a decrypted hash;

determining, by the framework, that the client is genuine in response to a determination that the decrypted hash is equal to a hash of a third concatenation of the client identification, the second challenge string, and the timestamp; and granting special privileges to the client based on the determination that the client is genuine.

* * * * *